United States Patent [19]

Sharps, Jr.

[11] Patent Number: 4,519,860
[45] Date of Patent: May 28, 1985

[54] METHOD AND APPARATUS FOR THE PRODUCTION OF A HIGH-STRENGTH, TEAR-RESISTANT POLYMER COMPOSITE

[75] Inventor: Gordon V. Sharps, Jr., Fairport, N.Y.

[73] Assignee: Mobil Oil Corporation, New York, N.Y.

[21] Appl. No.: 439,455

[22] Filed: Nov. 5, 1982

[51] Int. Cl.³ .............................................. B32B 7/04
[52] U.S. Cl. .................................... 156/161; 156/167; 156/178; 156/244.15; 156/244.23; 156/244.25; 264/103; 264/173; 264/210.1; 264/DIG. 81; 425/114
[58] Field of Search ............... 156/244.14, 244.15, 156/244.25, 244.23, 166, 167, 178, 161; 425/114; 264/210.1, 167, 171, 173, DIG. 81, 103

[56] References Cited

U.S. PATENT DOCUMENTS

| 3,034,941 | 5/1962 | Hessenthaler et al. | 156/244.25 |
| 3,534,437 | 10/1970 | Quackenbush | 425/114 |
| 3,589,958 | 6/1971 | Schrenk | 156/244.15 |
| 3,770,539 | 11/1973 | Bullock | 156/161 |
| 3,915,776 | 10/1975 | Kaempen | 156/161 |
| 3,926,706 | 12/1975 | Reifenhauser et al. | 156/244.14 |
| 3,957,566 | 5/1976 | Rahlfs | 156/244.14 |
| 3,959,057 | 5/1976 | Smith | 156/244.15 |
| 4,350,549 | 9/1982 | Frehner | 156/161 |
| 4,428,791 | 1/1984 | Reinke | 156/161 |

Primary Examiner—Jay H. Woo
Assistant Examiner—Timothy W. Heitbrink
Attorney, Agent, or Firm—Alexander J. McKillop; Michael G. Gilman; Charles J. Speciale

[57] ABSTRACT

A method and an apparatus for the production of a composite plastic material consisting of oriented polymer filaments and a polymer film web, and more particularly, the production of a composite material which possesses an improved physical strength and higher tear resistance in comparison with plastic film materials which are not reinforced. An extrusion die is used for example, a conventional tubular extrusion die for extruding a continuous blown tubular plastic film web and wherein the die orifice is encompassed by spinerette apertures through which there are concurrently extruded a plurality of polymer filaments which are oriented and initially conveyed along a path substantially parallel to but not in adherence with the blown tubular plastic film web. Upon a further separation of the filaments and the tubular film, the filaments may be at least partially coated with a suitable adhesive material and, thereafter, adhesively bonded or laminated to the surface of the film web in order to produce a composite material constituted of filaments and film.

15 Claims, 5 Drawing Figures

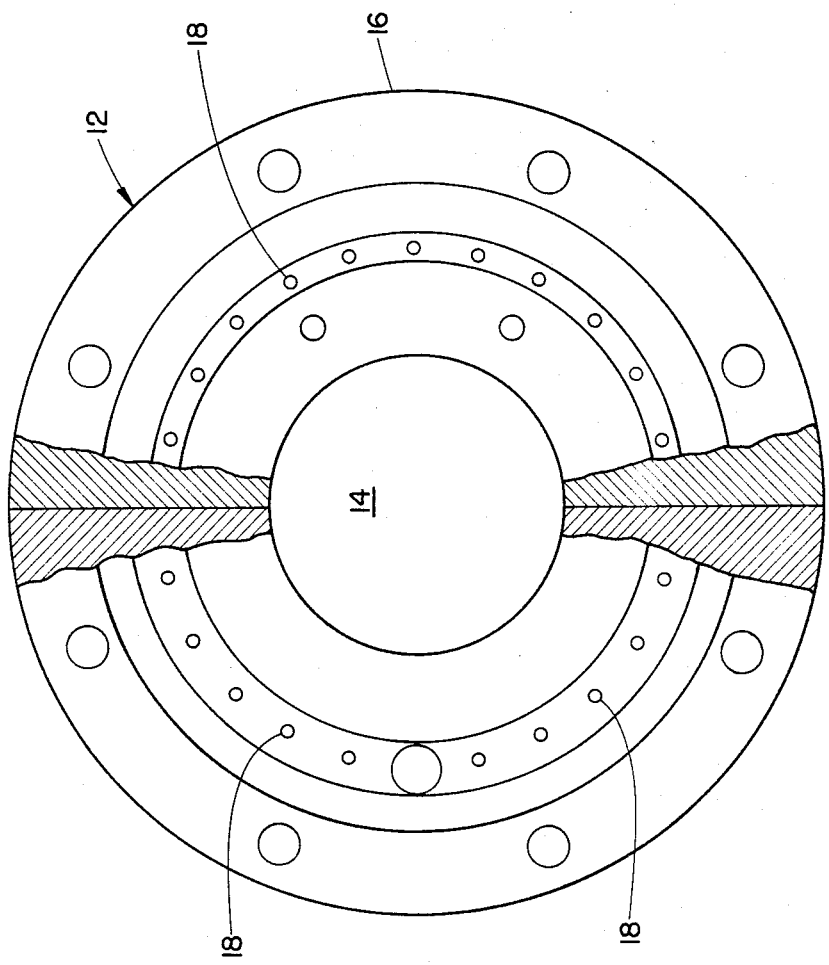

METHOD AND APPARATUS FOR THE PRODUCTION OF A HIGH-STRENGTH, TEAR-RESISTANT POLYMER COMPOSITE

BACKGROUND OF THE INVENTION

1. Field of the Invention

The present invention relates to a method and an apparatus for the production of a composite plastic material consisting of oriented polymer filaments and a polymer film web, and more particularly, to the production of a composite material which possesses an improved physical strength and higher tear resistance in comparison with plastic film materials which are not reinforced.

2. Discussion of the Prior Art

In recent times, plastic packaging material and bags have to a large extent supplemented or even supplanted similar articles which are constituted of paper, such plastic products being attractive in appearance to a consumer and frequently less expensive to manufacture. Quite frequently, bags which are formed of a polymer film web material are relatively limited in strength, dependent upon the thickness of the film material and, moreover, are readily subject to uncontrollable tearing which often renders the plastic bags unsuitable for use in the packaging or transporting of sharp-edged objects which may readily cause tears in the walls of the plastic bags.

Plastic bags are frequently produced from extruded tubular polymer film webs, or alternatively, may be produced from a continuous sheet of plastic film which has been extruded through a slot die. However, in order to reinforce the material in order to provide a finished product which is able to withstand higher loads and which is more tear-resistant, for example, when the web is formed into a bag, overwrap or similar item, it is desirable to form a reinforced material by adhesively bonding or laminating filaments to the plastic film web material. Such reinforcements may readily take the shape of either flat tapes or round cross-sectioned filaments which have an adhesive applied thereto and are then suitably adhesively bonded to the film web material so as to form a polymer composite having the desired physical characteristics, prior to such composite being formed into the final product.

SUMMARY OF THE INVENTION

In order to meet the demands of the industry, the present invention contemplates the provision of a method and an apparatus wherein basically conventional polymer material extrusion equipment may be employed with only relatively simple and inexpensive modifications effected thereto in order to produce therewith a polymer film web which is provided with reinforcing filaments adhesively bonded thereto, which will provide a composite material imparting enhanced physical properties, such as higher strength and tear resistance, to the film material. For this purpose, the invention provides for the utilization of an extrusion die, for example, a conventional tubular extrusion die for extruding a continuous blown tubular plastic film web and wherein, in a novel manner, the die orifice is encompassed by spinerette apertures through which there are concurrently extruded a plurality of polymer filaments which are subjected to high MD drawn down and are initially conveyed along a path substantially parallel to but not in adherence with the blown tubular plastic film web. Upon a further separation of the filaments and the tubular film, the filaments may be at least partially coated with a suitable adhesive material and, thereafter, adhesively bonded or laminated to the surface of the film web in order to produce a composite material constituted of oriented filaments and film which possesses a high degree of strength and resistance to tear of the film. Thus, the composite filament and film web material may be formed through the extrusion of the film web and the filaments in a single coextrusion procedure.

Accordingly, it is a primary object of the present invention to provide a method for the production of a composite polymer material formed through the continuous coextrusion of thermoplastic consisting of a thermoplastic film web and simultaneously oriented filaments which are adhesively bonded together to form a reinforced film web structure.

A more specific object of the invention is to provide a method for producing a continuous coextruded composite wherein a thermoplastic film material and highly oriented plastic filaments are concurrently extruded from a single extrusion die installation and wherein the filaments are then subsequently adhesively bonded to the extruded film material in order to provide a high strength, tear resistant plastic material.

Still another object of the present invention is to provide an apparatus for implementing the inventive method including a coextrusion die arrangement adapted to produce a continuous thermoplastic film web and concurrently separately coextruded oriented polymer filaments which are adapted to be adhesively bonded to the film web in order to form a high strength, tear resistant composite plastic material.

BRIEF DESCRIPTION OF THE DRAWINGS

Reference may now be had to the following detailed description of a preferred embodiment of an apparatus for producing the polymer filament and film web coextrusion composite pursuant to the invention, taken in conjunction with the accompanying drawings; in which:

FIG. 3 shows a top plan view, partly in section, through the die of FIG. 2;

DETAILED DESCRIPTION

Figures 1, 4, 5:
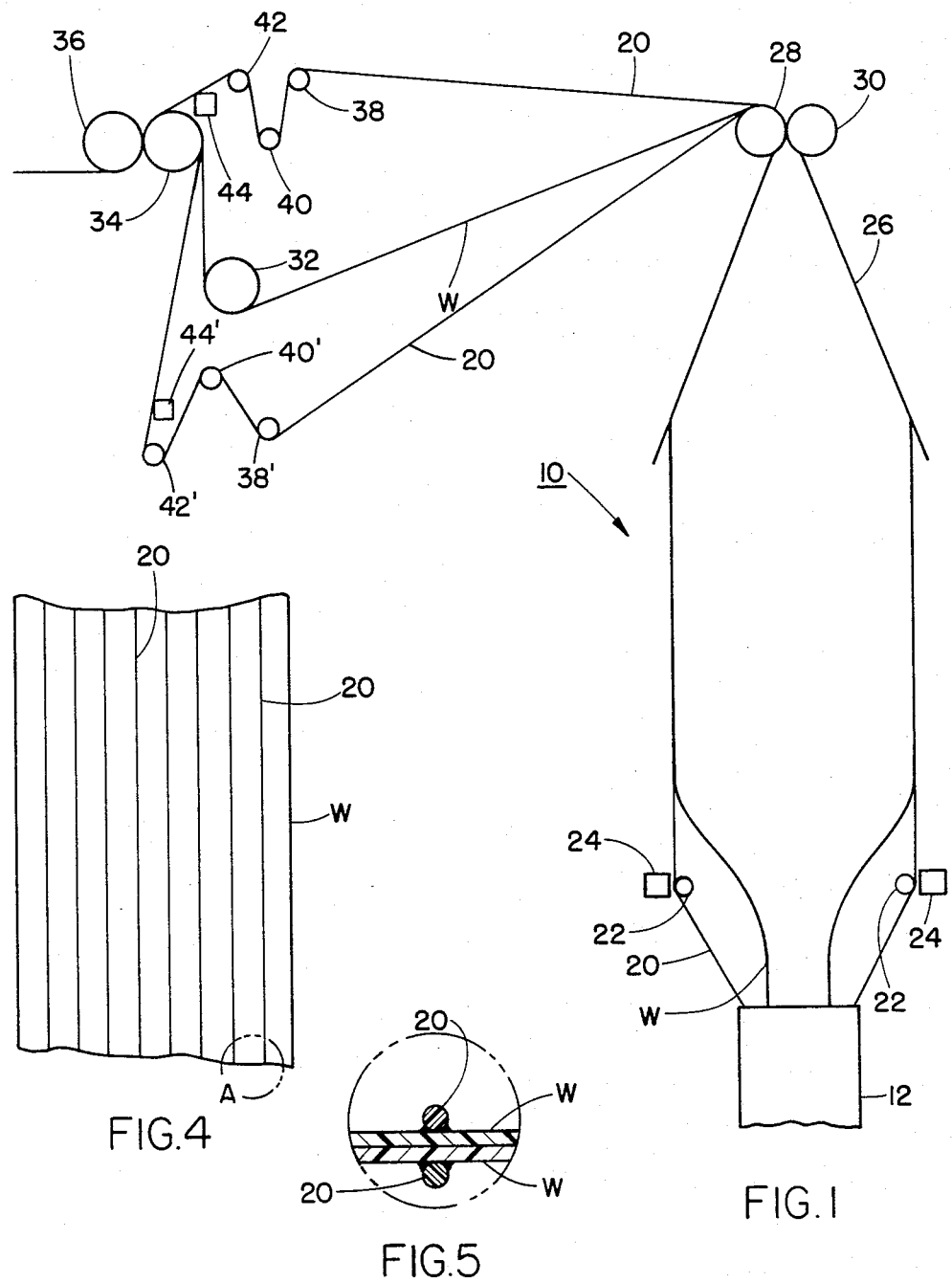
FIG. 1 schematically illustrates an apparatus for producing a continuous coextruded composite consisting of a thermoplastic film web and filaments which are adhesively bonded thereto.
FIG. 4 illustrates a portion of a composite plastic film material produced pursuant to the method and apparatus of the present invention.
FIG. 5 shows an enlarged scale fragmentary section through the composite material of FIG. 4 in the encircled portion A.
Figure 2:
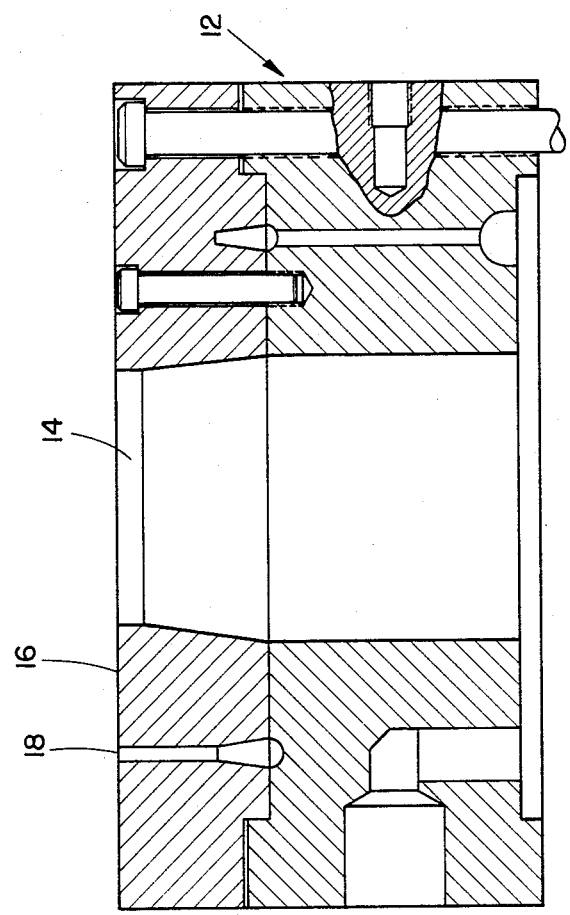
FIG. 2 shows a transverse sectional view through a tubular extrusion die for coextruding a tubular thermoplastic film and filaments which are to be adhesively bonded to the film.

Referring now in detail to the drawings, and particularly FIGS. 1 to 3, there is illustrated a coextrusion apparatus 10 for producing a plastic composite material constituted of a thermoplastic film web material and a plurality of oriented polymer filaments which are adapted to be adhesively bonded or laminated to the film web material so as to provide for a reinforced film construction.

The apparatus 10 includes an extrusion die 12 which, in this instance, is a tubular extrusion die having a central extrusion orifice 14 of known construction for extruding a blown tubular plastic film web W. The tubular extrusion die 12 may include an upper head 16 which is provided with a plurality of circumferentially spaced spinerette apertures 18, in this instance shown to be twenty-four in number, for concurrently extruding a plurality of filaments.

In this embodiment, the filaments are essentially of a circular cross-section and, if desired, may be of the same polymer material as the film web, in which case the material or melt within the die maybe supplied from a single source. Alternatively, if desired, the tubular blown film may be of one type of material, such as low-density or linear low-density polyethylene, whereas the filaments may be of a polymer material having a different composition, depending upon the intended use or application of the finished composite product.

In order to avoid the direct contact of the filaments 20 with the film web W upon extrusion from the die 12, since such contacting would cause the still hot filaments to adhere to the film web material and cause deformation of the film web during subsequent cooling, the hot filaments 20 are directed away from the extruded film web W through the intermediary of rollers 22, at which location they are exposed to a cooling air flow, for example, from an air ring 24. Thereafter, when the filaments 20 are sufficiently cooled to avoid their tacking to the film web W, they may then be drawn upwardly into the conically converging frame 26 and between nip rolls 28 and 30 without adhering to the contacting film web W. Upon passing the nip rolls 28, 30 the film web W is separated from the filaments 20, and the web W is conveyed over an idler roll 32 towards a second pair of nip rolls 34 and 36.

The filaments 20, which for purposes of illustration are shown on only one side of the film web W but in actuality may be arranged on both sides thereof, are conducted over a series of tension rollers 38, 40 and 42 which provide for the required tension control in order to maintain the filaments 20 under a predetermined tensile load. The filaments 20 are then conveyed over a hot melt adhesive applicator 44, which applies an adhesive to at least those surfaces of the filaments 20 which are adapted to adhesively contact and be laminated to the film web W. From the hot melt applicator 44 the filaments are then conveyed into contact with the film web W on the surface of nip roll 34 and conducted into the bite between nip rolls 34, 36 so as to be pressure-bonded with the film web W to form the composite filament and web structure pursuant to the present invention.

The nip rolls 34, 36 may be temperature controlled through suitable temperature devices (not shown) so as to either heat or cool the nip rolls, as desired, in order to allow for optimum adhesive bonding and laminating conditions between the filaments 20 and the film web W.

In order to maintain the film web under an appropriate tensile load when being contacted by the filaments 20 along the surface of nip roll 34, appropriate differential speeds may be maintained between the nip rolls 34, 36 and nip rolls 28, 30.

Subsequently, the adhesively bonded filament and film web composite may be conveyed from the nip rolls 34, 36 to a suitable winding roll for storage or, alternatively, conveyed towards various other processing operations, such as a bag making or slitting installation.

The utilization of a standard extrusion die which has only been modified to a relatively minor extent in order to provide for the concurrent extrusion of oriented polymer filaments with the tubular film web imparts the capability of providing a reinforced plastic film structure with only little additional increase in material costs while dramatically enhancing the physical strength and tear resistance of the finished composite product in contrast with unreinforced plastic film material.

Referring to FIGS. 4 and 5 of the drawings, the plastic film web W which has been produced according to the inventive method and apparatus, and which has the filaments 20 laminated thereto, clearly illustrates that the structure of the plastic composite material provides for a much more rigid and sturdy appearance and enhanced physical characteristics in comparison with unreinforced plastic film material, while being of a simple construction and relatively inexpensive to produce.

Although the inventive apparatus has been described in connection with a tubular film extruding apparatus, it is readily apparent to one skilled in the art that the invention would be equally applicable to the extrusion of a plastic film by means of a slot die and providing spinerette apertures on one or both sides of the die in order to form a filament and film composite material having properties analogous to those described hereinabove.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A method of producing a continuous coextruded plastic composite material consisting of a thermoplastic film web and polymer filaments adhesively bonded thereto; comprising:

(a) extruding a continuous web of a thermoplastic film material from an extrusion die;
   (b) concurrently extruding a plurality of oriented thermoplastic filaments from said extrusion die in spaced relationship with said film web, substantially immediately directing the filaments away from the film web to facilitate cooling of the filaments and prevent distortion of the film web and maintaining said film web and filaments apart for a predetermined time interval subsequent to the extrusion from said die to allow for cooling of the filaments and film web;
   (c) contacting said film web with said filaments and conveying the superimposed film webs and filaments between first nip rolls after the filaments and film web have been sufficiently cooled to avoid adherence between the filaments and film web and deformation of the web subsequent cooling;
   (d) separating said filaments from said film web and imparting tension to said filaments to maintain uniform filament tension and maintain the filaments under a predetermined tensile load;

(e) applying an adhesive to said filaments on at least the surfaces facing towards said film web;

(f) and contacting said film web and the adhesive-coated surfaces of said filaments; and conveying said contacted film web and filaments between second nip rolls to adhesively bond said filaments to said film web and form said composite material.

2. A method as claimed in claim 1, comprising controlling the temperature of said second nip rolls for regulating the extent of adhesive bonding between said filaments and said film web.

3. A method as claimed in claim 1, comprising cooling said filaments prior to initial contacting of said filaments with said film web subsequent to extrusion thereof so as to preclude said filaments from adhering to said film web.

4. A method as claimed in claim 1, comprising controlling the speed of said second nip rolls relative to the speed of said first nip rolls to maintain a predetermined film web tension during adhesive bonding with said filaments.

5. A method as claimed in claim 1, said film web comprising a tubular film extruded from an annular die, said filaments being extruded through spinerette apertures spaced about the circumference of said annular die.

6. A method as claimed in claim 1, said filaments consisting of low density polyethylene.

7. A method as claimed in claim 1, said filaments consisting of circular strands having a diameter of about 0.020 inches.

8. An apparatus for the production of a continuous coextruded plastic composite material consisting of a thermoplastic film web and polymer filaments adhesively bonded thereto; comprising:

(a) a coextrusion die for concurrently extruding a continuous web of thermoplastic material and a plurality of oriented polymer filaments in spaced relationship with said film web and means for substantially immediately directing the filaments away from the film web after extrusion thereof to facilitate cooling of the filaments and to prevent film web distortion (b) means for orienting and cooling said filaments prior to contacting said film web to prevent adhesion between said film web and said filaments upon superposition therebetween and permitting the filaments and film web to be sufficiently cooled to facilitate avoiding adherence between the filaments and film web thereafter and distortion of the film during subsequent cooling;

(c) first nip rolls contacting said film web and said filaments, said film web and said filaments being separated after passing between said first nip rolls;

(d) means for imparting a predetermined tension to said filaments and maintaining the filaments under a predetermined tensile load;

(e) means for applying an adhesive to said filaments;

(f) and second nip rolls receiving said film web and adhesive-coated filaments and applying pressure thereto to form said adhesively bonded film web and filament composite material.

9. An apparatus as claimed in claim 8, wherein said second nip rolls are temperature-controlled for regulating the temperature of said adhesive-coated filaments and film web during adhesive bonding thereof between said second nip rolls.

10. An apparatus as claimed in claim 8, wherein the speed of said second nip rolls is regulated relative to the speed of said first nip rolls to maintain a predetermined tension in said film web during adhesive bonding with said filaments.

11. An apparatus as claimed in claim 8, said filament cooling means comprising means for directing a flow of cooling air against said filaments.

12. An apparatus as claimed in claim 8, said means for applying adhesive to said filaments comprising a hot melt adhesive applicator.

13. An apparatus as claimed in claim 8, said coextrusion die comprising an annular die for extruding a tubular film web; and spinerette apertures being spaced about said annular die for concurrently extruding said filaments.

14. An apparatus as claimed in claim 13, said filament cooling means including a cooling ring directing a flow of air against said filaments.

15. An apparatus as claimed in claim 14, comprising guide roller means for directing said filaments past said cooling means.

* * * * *